United States Patent
Döring et al.

(10) Patent No.: US 10,094,270 B2
(45) Date of Patent: Oct. 9, 2018

(54) INTERNAL COMBUSTION ENGINE, METHOD FOR OPERATING THE SAME AND CONTROL DEVICE FOR CARRYING OUT THE METHOD

(71) Applicant: MAN DIESEL & TURBO SE, Augsburg (DE)

(72) Inventors: Andreas Döring, Munich (DE); Julia Maier, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 68 days.

(21) Appl. No.: 15/019,511

(22) Filed: Feb. 9, 2016

(65) Prior Publication Data

US 2017/0030258 A1    Feb. 2, 2017

(30) Foreign Application Priority Data

Feb. 10, 2015  (DE) .................. 10 2015 001 662

(51) Int. Cl.
*F01N 3/021* (2006.01)
*F01N 3/10* (2006.01)
(Continued)

(52) U.S. Cl.
CPC .............. *F02B 37/10* (2013.01); *F01N 3/021* (2013.01); *F01N 3/103* (2013.01); *F01N 3/2066* (2013.01); *F01N 5/04* (2013.01); *F02B 37/004* (2013.01); *F02B 37/013* (2013.01); *F02B 37/12* (2013.01); *F02B 39/04* (2013.01); *F02B 39/10* (2013.01); *F02B 75/18* (2013.01); *F01N 2340/06* (2013.01); *Y02T 10/144* (2013.01); *Y02T 10/16* (2013.01); *Y02T 10/24* (2013.01)

(58) Field of Classification Search
CPC ........ F01N 3/021; F01N 3/103; F01N 3/2066; F01N 5/04; F01N 2340/06; F02B 37/004; F02B 37/013; F02B 37/10; F02B 37/12; F02B 39/04; F02B 39/10; F02B 75/18; Y02T 10/144; Y02T 10/16; Y02T 10/24
See application file for complete search history.

(56) References Cited

U.S. PATENT DOCUMENTS

| | | | | |
|---|---|---|---|---|
| 4,958,497 A | * | 9/1990 | Kawamura | ........... F02B 37/013 60/608 |
| 2002/0014072 A1 | * | 2/2002 | Nakagawa | ............ F01N 3/2006 60/285 |

(Continued)

*Primary Examiner* — Brandon Lee
(74) *Attorney, Agent, or Firm* — Cozen O'Connor

(57) ABSTRACT

An internal combustion engine includes: plural cylinders, a first exhaust gas turbocharger having a high-pressure turbine and a high-pressure compressor, a second exhaust gas turbocharger having a low-pressure turbine and a low-pressure compressor, and an SCR catalytic converter positioned between the high-pressure turbine and the low-pressure turbine, via which exhaust gas leaving the high-pressure turbine is conducted upstream of the low-pressure turbine. The low-pressure compressor is assigned a power take-in, via which the low-pressure compressor can be driven when as a consequence of a relatively large exhaust gas temperature drop at the SCR catalytic converter via the low-pressure turbine an adequate amount of energy required to supply the cylinders of the internal combustion engine with a desired quantity of charge air can no longer be provided.

8 Claims, 3 Drawing Sheets

(51) Int. Cl.
*F01N 3/20* (2006.01)
*F02B 37/10* (2006.01)
*F02B 39/10* (2006.01)
*F02B 75/18* (2006.01)
*F02B 37/013* (2006.01)
*F02B 37/12* (2006.01)
*F01N 5/04* (2006.01)
*F02B 37/00* (2006.01)
*F02B 39/04* (2006.01)

(56) References Cited

U.S. PATENT DOCUMENTS

| | | | |
|---|---|---|---|
| 2009/0178406 A1* | 7/2009 | Matthews | F01N 3/021 60/602 |
| 2009/0259388 A1* | 10/2009 | Vetrovec | F02B 33/40 701/103 |
| 2010/0100300 A1* | 4/2010 | Brooks | F02B 29/0412 701/102 |
| 2011/0016855 A1* | 1/2011 | Shimizu | F01N 3/2006 60/300 |

* cited by examiner

INTERNAL COMBUSTION ENGINE, METHOD FOR OPERATING THE SAME AND CONTROL DEVICE FOR CARRYING OUT THE METHOD

BACKGROUND OF THE INVENTION

1. Field of the Invention

The invention relates to an internal combustion engine, to a method for operating an internal combustion engine and to a control device for carrying out the method.

2. Description of the Related Art

Internal combustion engines with multi-stage exhaust gas supercharging are thoroughly known from practice. Accordingly, an internal combustion engine with multi-stage exhaust gas supercharging comprises multiple cylinders and multiple exhaust gas turbochargers, wherein in the turbines of the exhaust gas turbochargers exhaust gas leaving the internal combustion engine is expanded, and wherein energy extracted in the turbines of the exhaust gas turbochargers is utilized in the compressors of the exhaust gas turbochargers in order to compress charge air to be fed to the cylinders of the internal combustion engine. In the case of an internal combustion engine with a high-pressure exhaust gas turbocharger and a low-pressure exhaust gas turbocharger, the exhaust gas leaving the internal combustion engine is initially expanded in the high-pressure turbine of the high-pressure exhaust gas turbocharger and subsequently for further expansion conducted via the low-pressure turbine of the low-pressure exhaust gas turbocharger. Energy extracted in the low-pressure turbine of the low-pressure turbocharger is utilized in order to compress charge air to be fed to the cylinders of the internal combustion engine initially in the low-pressure of the low-pressure exhaust gas turbocharger, wherein already compressed charge air leaving the low-pressure compressor is further compressed in the high-pressure compressor of the high-pressure exhaust gas turbocharger, namely utilizing the energy in the high-pressure turbine of the high-pressure exhaust gas turbocharger. In this case, a so-called charge air cooler each can be positioned downstream of the low-pressure compressor and upstream of the high-pressure compressor, a so-called charge air cooler each can be positioned in this case.

From practice it is already known, furthermore, to position a selective catalytic reduction (SCR) catalytic converter in supercharged internal combustion engines between the high-pressure turbine of the high-pressure exhaust gas turbocharger and the low-pressure turbine of the low-pressure exhaust gas turbocharger, so that exhaust gas expanded in the high-pressure turbine of the high-pressure exhaust gas turbocharger is initially conducted via the SCR catalytic converter and only following this via the low-pressure turbine of the low-pressure exhaust gas turbocharger. The temperatures and pressures that are present downstream of the high-pressure turbine and upstream of the low-pressure turbine are particularly advantageous for the exhaust gas aftertreatment in an SCR catalytic converter.

Such an SCR catalytic converter has a relatively high heat capacity, so that in particular after the start of the internal combustion engine or during load jumps of the same relatively much thermal energy of the exhaust gas for heating-up the SCR catalytic converter is lost, so that accordingly a greater exhaust gas temperature gradient can form via the SCR catalytic converter. This can result in the low-pressure turbine of the low-pressure exhaust gas turbocharger no longer being able to provide an adequate amount of energy required in the low-pressure compressor of the low-pressure exhaust gas turbocharger to ultimately supply the cylinders of the internal combustion engine with a desired charge air quantity. Because of this, the so-called load impact capability of the internal combustion engine is restricted in particular during the cold start of an internal combustion engine or during load jumps.

SUMMARY OF THE INVENTION

There is therefore a need for an internal combustion engine, for a method for operating the same and for a control device for carrying out the method with which the load impact capability of the internal combustion engine can be improved. Starting out from this, an object of the present invention is to create a new type of internal combustion engine, a method for operating the same and a control device for carrying out the method.

According to one aspect of the invention, the low-pressure compressor is assigned a power take-in via which the low-pressure compressor can be driven in particular when, as a consequence of a relatively large exhaust gas temperature drop at the SCR catalytic converter, an adequate amount of energy cannot be provided via the low-pressure turbine, which is required in order to supply the cylinders of the internal combustion engine with a desired charge air quantity. By way of the power take-in at the low-pressure compressor this energy drop at the low-pressure turbine can be offset, in particular when, as a consequence of an excessive exhaust gas temperature drop at the SCR catalytic converter, an adequate amount of energy can no longer be extracted at the low-pressure turbine required for driving the low-pressure compressor. Even when, as a consequence of an excessive exhaust gas temperature drop via the SCR catalytic converter, the energy that can be extracted at the low-pressure turbine accordingly is too low, the low-pressure compressor can be driven via the power take-in such that ultimately the cylinders of the internal combustion engine can be supplied with a desired charge air quantity. Because of this, a good load impact capability can be ensured, in particular during the cold start of the internal combustion engine or during load jumps.

According to an advantageous further development, a first temperature sensor is arranged downstream of the high-pressure turbine and upstream of the SCR catalytic converter, wherein downstream of the SCR catalytic converter and upstream of the low-pressure turbine a second temperature sensor is arranged, and wherein a control device automatically determines and automatically adjusts the amount of energy to be provided at the power take-in for the driving of the low-pressure compressor dependent on a temperature difference between the exhaust gas temperatures measured at the first temperature sensor and the exhaust gas temperatures measured at the second temperature sensor. With this advantageous further development, automatic operation of the power take-in is possible in order to automatically offset a drop in energy, which can no longer be extracted at the low-pressure turbine, via the power take-in.

According to an advantageous further development, the high-pressure turbine is assigned a power take-out, via which energy for driving the low-pressure compressor can be extracted from the high-pressure turbine, wherein this energy extracted via the power take-out on the high-pressure turbine can be used for driving the power take-in and thus the low-pressure compressor. A particularly economical operation of the internal combustion engine is thereby possible. Excess energy extracted at the high-pressure turbine not required for operating the high-pressure compressor can thus be utilized for driving the power take-in and thus for driving the low-pressure compressor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the following description. Exemplary embodiments of the invention are explained in more detail with the help of the drawings without being restricted to this. In the drawings.

DETAILED DESCRIPTION OF THE PRESENTLY PREFERRED EMBODIMENTS

The present invention relates to an internal combustion engine, to a method for operating such an internal combustion engine and to a control device for carrying out the method.

Figure 1:
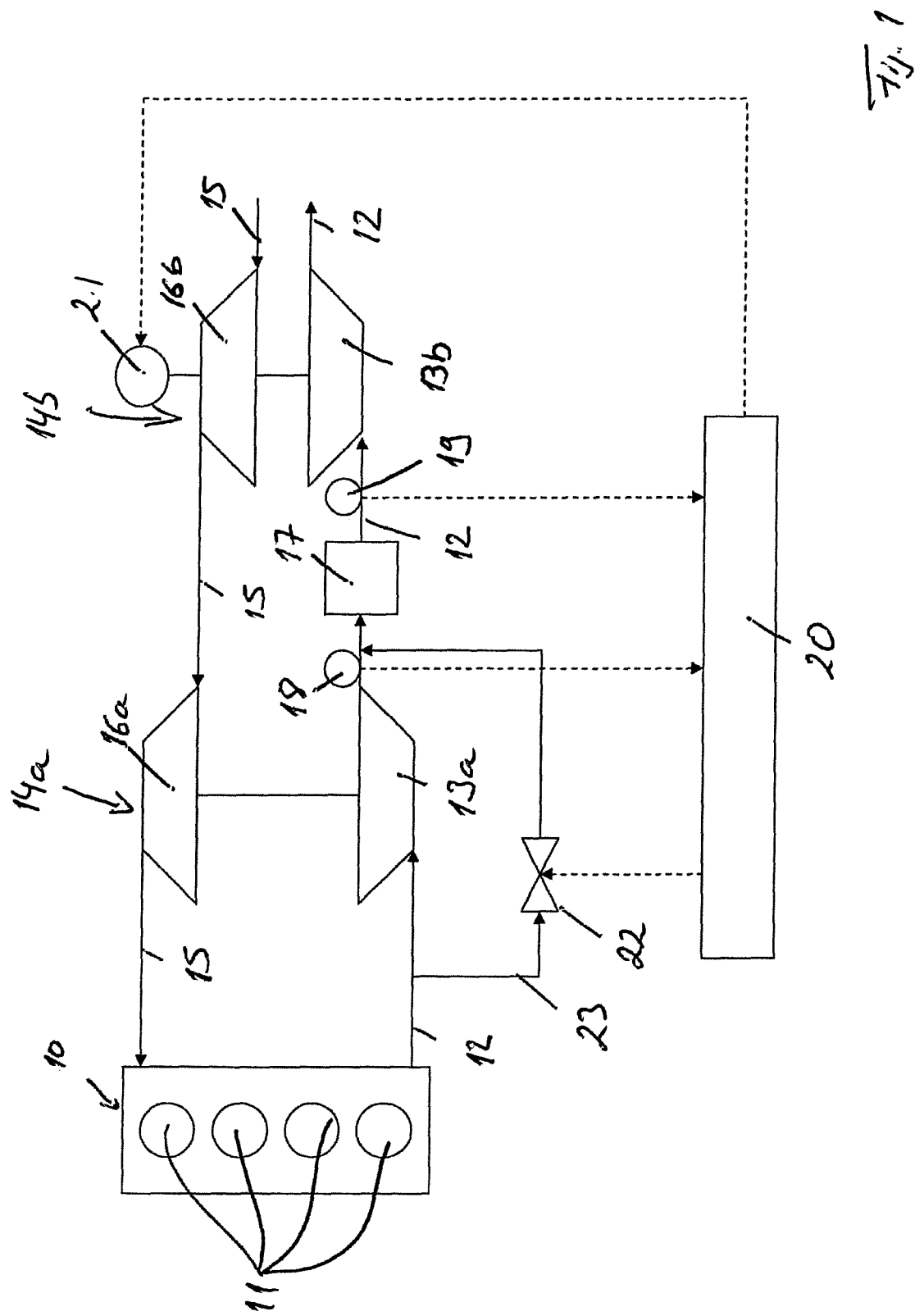
FIG. 1: is a diagram of a first internal combustion engine according to the invention.

FIG. 1 is a diagram of a first internal combustion engine 10 according to the invention with multiple cylinders 11. The internal combustion engine 10, in an exemplary embodiment, is a marine diesel engine operated with heavy fuel oil.

Exhaust gas 12, which leaves the cylinders of the internal combustion engine 11, is initially conducted via a high-pressure turbine 13a of a first exhaust gas turbocharger 14a to extract energy during this expansion of the exhaust gas 12 in the high-pressure turbine 13a, which is utilized for driving a high-pressure compressor 16a of the first exhaust gas turbocharger 14a.

Exhaust gas 12 expanded in the high-pressure turbine 13a is conducted upstream of the high-pressure turbine 13a via a low-pressure turbine 13b of a second exhaust gas turbocharger 14b to be further expanded in the low-pressure turbine 13b and to utilize energy extracted in the process for driving a low-pressure compressor 16b of the second exhaust gas turbocharger 14b.

Accordingly, charge air 15 to be fed to the cylinders 11 of the internal combustion engine 10 is initially compressed in the low-pressure compressor 16b of the second exhaust gas turbocharger 14b and subsequently in the high-pressure compressor 16a of the first exhaust gas turbocharger 14a, in order to subsequently feed the same to the cylinders 11 of the internal combustion engine 10. Although not shown, it is possible that charge air coolers be positioned, one downstream of the low-pressure 16b and one upstream of the high-pressure compressor 16a.

Downstream of the high-pressure turbine 13a and upstream of the low-pressure turbine 13b an SCR catalytic converter 17 is positioned, in which exhaust gas expanded in the high-pressure turbine 13a, prior to the expansion in the low-pressure turbine 13b, is subjected to exhaust gas cleaning. The temperatures and pressures present downstream of the high-pressure turbine 13a and upstream of the low-pressure turbine 13b are particularly advantageous for exhaust gas aftertreatment in the SCR catalytic converter 17.

The SCR catalytic converter 17 has a relatively high heat capacity. For this reason, thermal energy of the exhaust gas 12 for heating up the SCR catalytic converter 17 may no longer be available in the region of the low-pressure turbine 13b and can no longer be utilized for driving the low-pressure compressor 16b. For this reason, the problem can occur according to the prior art that, as a consequence of an excessive temperature drop via the SCR catalytic converter 17, an adequate amount of energy can no longer be extracted in the low-pressure turbine 16b, which is actually required on the low-pressure compressor 16b in order to supply the cylinders 11 of the internal combustion engine 10 with sufficient charge air.

According to the invention, the low-pressure compressor 16b is assigned a power take-in (PTI) 21. By way of the power take-in 21, the low-pressure compressor 16b can be driven, in particular when as a consequence of a relatively large exhaust gas temperature drop at the SCR catalytic converter 17 an adequate amount of energy can no longer be provided via the low-pressure turbine 13b, which is required per se in order to supply the cylinders 11 of the internal combustion engine with a desired quantity of charge air. Accordingly, a power drop at the low-pressure turbine 13b can be offset via the power take-in 21 in that the low-pressure compressor 16b is driven via the power take-in 21.

Particularly advantageous is a version of the invention in which downstream of the high-pressure turbine 13a and upstream of the SCR catalytic converter 17 a first temperature sensor 18 is arranged, and downstream of the SCR catalytic converter 17 and upstream of the low-pressure turbine 13a a second temperature sensor 19 is arranged, wherein a control device 20, dependent on the temperature difference between the exhaust gas temperatures detected via the temperature sensors 18, 19, automatically determines the amount of energy to be provided at the power take-in 21 for driving the low-pressure compressor 16b and activates the power take-in 21 such that the power take-in 21 automatically provides this amount of energy at the low-pressure compressor 16b.

In this case, a power drop on the low-pressure turbine 13b, which is caused by a drop in the exhaust gas temperature via the SCR catalytic converter 17, can be automatically offset via the power take-in 21.

The power take-in 21 of FIG. 1 can, for example, be an electric motor which, as already explained, is automatically activated and operated by the control device 20 dependent on the temperature drop via the SCR catalytic converter 17.

In addition, FIG. 1 shows a wastegate valve 22 positioned in a bypass 23 to the high-pressure turbine 13a, via which, in particular when the internal combustion engine is operated at full load for example, exhaust gas can be conducted past the high-pressure turbine 13a. Such wastegate valves are known from the prior art.

Figure 2:
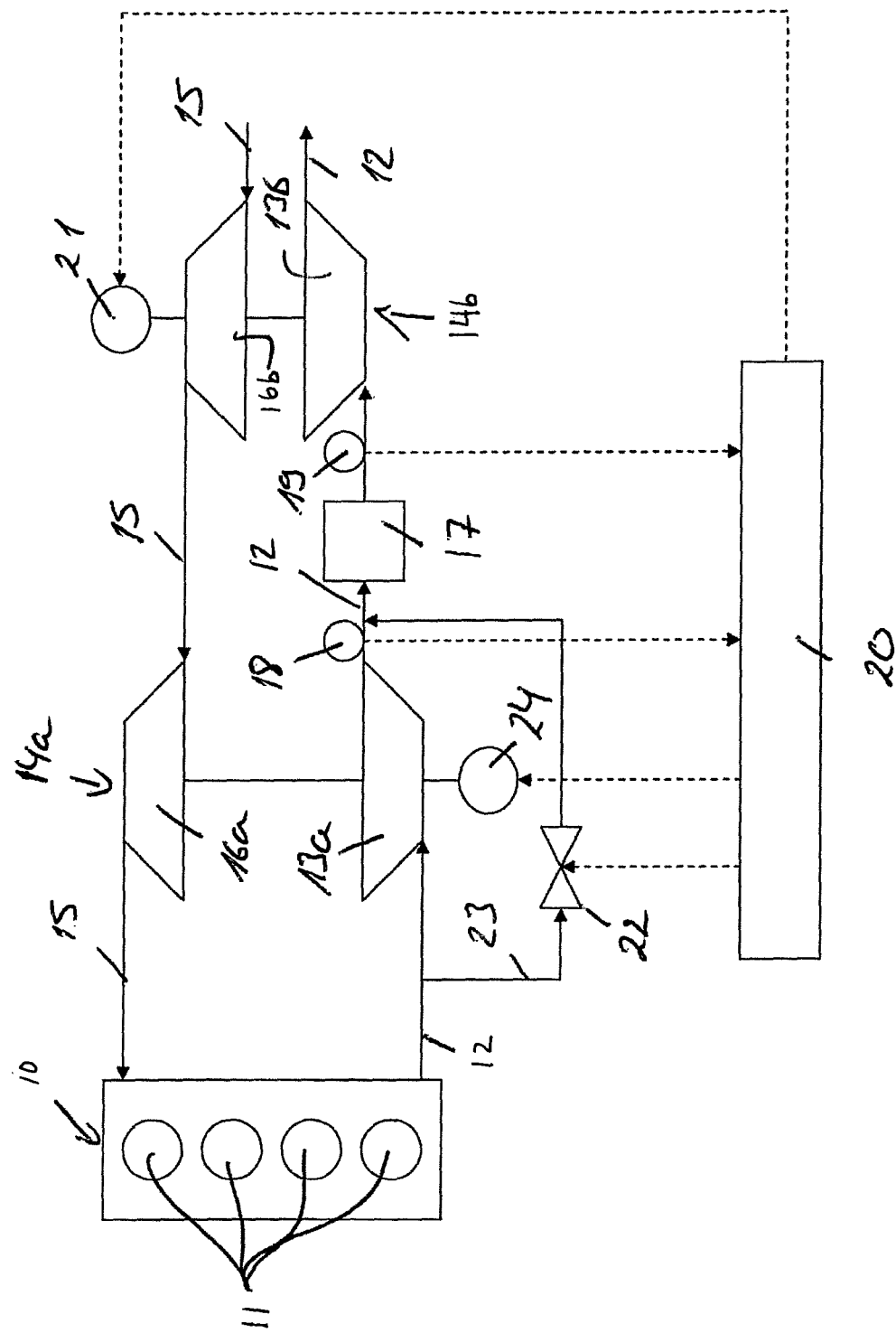
FIG. 2: is a diagram of a second internal combustion engine according to the invention.

A further development of the exemplary embodiment of FIG. 1 is shown in FIG. 2, wherein in FIG. 2 the high-pressure turbine 13a is assigned a power take-out (PTO) 24. By way of the power take-out 24, energy can be extracted from the high-pressure turbine 13a, which is then utilized in the region of the power take-in 21 in order to drive the low-pressure compressor 16b. This is possible in particular when, for example, during full load operation the exhaust gas quantity of the internal combustion engine 10 is so great that more energy is generated at the high-pressure turbine 13a than is needed for driving the high-pressure compressor 16a. In this case, the wastegate valve 22 would be opened the prior art in order to conduct the exhaust gas past the high-pressure turbine 13a via the bypass 23. This excess energy however can be extracted via the power take-out 24 and utilized for driving the power take-in 21 assigned to the low-pressure compressor 16b.

In the process it is possible that the energy extracted at the power take-out 24 in the region of the high-pressure turbine 13a is directly utilized in the region of the power take-in 21 in order to drive the low-pressure compressor 16b. Accordingly, the power take-out 24 can be an electric machine which, in a generator mode, generates electric energy, which is then directly utilized in the region of the power take-in 21 designed as electric motor in order to drive the low-pressure compressor 16b, namely dependent on the temperature drop via the SCR catalytic converter 17.

If, for example, in a stationary operating mode the SCR catalytic converter 17 is already heated up and an adequate amount of energy can be extracted for driving the low-pressure compressor 16b, it can be provided, furthermore, that the power take-out 24 assigned to the high-pressure turbine 13a generates electric energy in a generator mode, which is then utilized for charging an electric energy storage unit 25 (see FIG. 3) in order to utilize the same later on for driving the power take-in 21 and thus the low-pressure compressor 16b.

The power take-out 24 can also be mechanically coupled to the power take-in 21.

In this case, a shaft then extends, for example, between the power take-out 24 of the high-pressure turbine 13a and the power take-in 21 of the low-pressure compressor 16b, which can be assigned a disengageable clutch, wherein the clutch can be automatically opened or closed by the control device 20 dependent on the temperature drop via the SCR catalytic converter 17, in order to thereby determine if via the power take-out 24 in the region of the high-pressure turbine 13a energy for driving the power take-in 21 and thus for driving the low-pressure compressor 16b is extracted.

Figure 3:
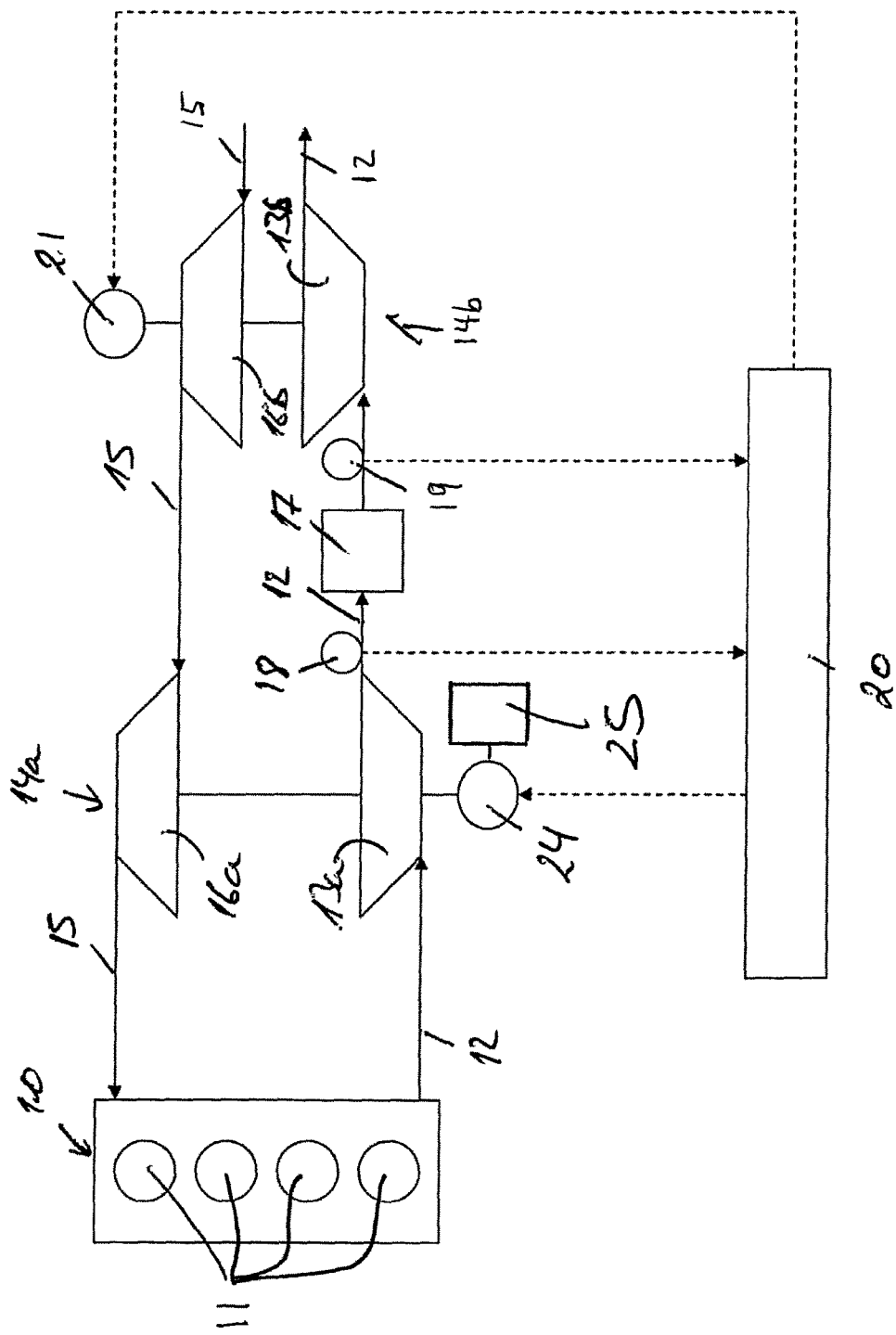
FIG. 3: is a diagram of a third internal combustion engine according to the invention.

In particular when the high-pressure turbine 13a is assigned the power take-out 24, a bypass with a wastegate valve 22 can also be completely omitted as is evident from FIG. 3, namely in that in particular when in the region of the high-pressure turbine 13a more energy is generated than is needed in the region of the high-pressure compressor 16a, energy is continuously extracted via the power take-out 24 in order to for example charge the electric energy storage unit 25.

The present invention therefore can assign a power take-in 21 to the low-pressure compressor 16b. In particular when as a consequence of insufficient exhaust gas energy adequate energy cannot be extracted in the region of the low-pressure turbine 13b in order to suitably drive the low-pressure compressor 16b, this can be offset via the power take-in 21 to accelerate the low-pressure compressor 16b to an adequate rotational speed and ultimately supply the cylinders 11 of the internal combustion engine 10 with adequate charge air. Because of this, the so-called load impact capability of the internal combustion engine 10 can be improved.

The operation of the power take-in 21 is preferentially automatically controlled or regulated, namely dependent on an exhaust gas temperature drop which occurs along the SCR catalytic converter 17. To this end, a temperature sensor 18 is positioned upstream of the SCR catalytic converter 17 and a temperature sensor 19 is positioned downstream of the SCR catalytic converter 17. By virtue of those sensor 18, 19, ultimately the temperature drop along the SCR catalytic converter 17 can be detected. Dependent on this temperature drop, the power take-in 21 is automatically operated to operate the low-pressure compressor subject to offsetting the exhaust gas energy loss along the SCR catalytic converter 17. The greater the temperature drop and thus the energy loss along the SCR catalytic converter 17, the more energy is fed to the power take-in 21 and thus to the low-pressure compressor 16b, in order to supply the cylinders 11 of the internal combustion engine 10 with an adequate amount of charge air.

In particular when in a stationary operating mode along the SCR catalytic converter 17 no noticeable exhaust gas temperature drop occurs any longer, the power take-in 21 can be automatically shut down via the control device 20 since then an adequate amount of energy for driving the low-pressure compressor 16b can be extracted in the region of the low-pressure turbine 13b.

The invention, furthermore, relates to a control device 20 configured to carry out the method described above for operating an internal combustion engine, the control device 20 comprises structure for carrying out the method, in particular software and hardware. The hardware includes interfaces configured to exchange data with the assemblies involved with carrying out the method according to the invention. Furthermore, the hardware includes a processor configured to perform data processing and a storage unit for data storage. The software comprises program modules configured to, when executed by the processor, carry out the method according to the invention.

Although in the described embodiment reference is mainly made to an SCR catalytic converter, the method is not restricted to such. It can also be employed with other components such as for example particle filters, CO oxidation, $CH_2O$ oxidation or $CH_4$ oxidation catalytic converters.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An internal combustion engine (10) comprising:
   a plurality of cylinders (11), the cylinders producing exhaust gas (12);
   a first exhaust gas turbocharger (14a) including a high-pressure turbine (13a) and a high-pressure compressor (16a);
   a second exhaust gas turbocharger (14b) including a low-pressure turbine (13b) and a low-pressure compressor (16b);
   at least one exhaust gas aftertreatment device positioned between the high-pressure turbine (13a) and the low-pressure turbine (13b), the at least one exhaust gas aftertreatment device being at least one selected from the group of: a particle filter, a CO oxidation catalytic converter, $CH_2O$ oxidation catalytic converter, a $CH_4$ oxidation catalytic converter, and an SCR catalytic converter (17), the at least one exhaust gas aftertreatment device conducting all of the exhaust gas (12) produced by the cylinders (11), including any exhaust gas (12) leaving the high-pressure turbine (13a), downstream to the low-pressure turbine (13b);

a first temperature sensor (18) arranged downstream of the high-pressure turbine (13a) and upstream of the at least one exhaust gas aftertreatment device;

a second temperature sensor (19) arranged downstream of the at least one exhaust gas aftertreatment device and upstream of the low-pressure turbine (13a);

a power take-in (21) coupled to the low-pressure compressor (16b), the power take-in (21) being configured to provide extra energy to the low-pressure compressor (16b) in a case in which an exhaust gas temperature drop greater than a threshold amount occurs at the at least one exhaust gas aftertreatment device; and a control device (20) configured to automatically determine and automatically adjust, based on a temperature difference between the temperature of the exhaust gas (12) measured at the first temperature sensor (18) and the temperature of the exhaust gas (12) measured at the second temperature sensor (19), the amount of extra energy provided at the power take-in (21) for driving the low-pressure compressor (16b), such that the greater the temperature drop and thus the energy loss along the at least one exhaust gas aftertreatment device, the more energy is fed to the power take-in (21) and thus to the low-pressure compressor (16b), so as to supply the cylinders (11) of the internal combustion engine (10) with an adequate amount of charge air.

2. The internal combustion engine according to claim 1, further comprising a power take-out, coupled to the high-pressure turbine (13a), the power take-out (24) being configured to extract energy at the high-pressure turbine (13a) for driving the low-pressure compressor (16b).

3. The internal combustion engine according to claim 1, wherein the power take-in (21) comprises an electric motor.

4. The internal combustion engine according to claim 2, wherein the power take-out (24) comprises an electric machine having a generator that is configured to, when the high-pressure turbine (13a) provides more than a threshold amount of energy to the high-pressure compressor (16a), convert the excess energy into electric energy, wherein the electric energy is directly utilizable for driving the power take-in (21) and the low-pressure compressor (16b), and wherein the electric energy is utilizable to charge an electric energy storage unit.

5. The internal combustion engine according to claim 2, wherein the power take-out (24) is mechanically coupled to the power take-in (21).

6. A method for operating an internal combustion engine (10) having a plurality of cylinders (11), the cylinders producing exhaust gas (12), a first exhaust gas turbocharger (14a) including a high-pressure turbine (13a) and a high-pressure compressor (16a), a second exhaust gas turbocharger (14b) including a low-pressure turbine (13b) and a low-pressure compressor (16b), at least one exhaust gas aftertreatment device positioned between the high-pressure turbine (13a) and the low-pressure turbine (13b), the at least one exhaust gas aftertreatment device being at least one selected from the group of: a particle filter, a CO oxidation catalytic converter, $CH_2O$ oxidation catalytic converter, a $CH_4$ oxidation catalytic converter, and an SCR catalytic converter (17), the at least one exhaust gas aftertreatment device conducting all of the exhaust gas (12), produced by the cylinders (11), including any exhaust gas (12) leaving the high-pressure turbine (13a), downstream to the low-pressure turbine (13b), and a power take-in (21) coupled to the low-pressure compressor (16b), the method comprising:

driving, with the power take-in (21), by providing extra energy to the low-pressure compressor (16b) in a case in which and exhaust gas temperature drop greater than a threshold amount occurs at the at least one exhaust gas aftertreatment device;

determining exhaust gas temperatures with a first temperature sensor (18) positioned downstream of the high-pressure turbine (13a) and upstream of the at least one exhaust gas aftertreatment device and with a second temperature sensor (19) positioned downstream of the at least one exhaust gas aftertreatment device and upstream of the low-pressure turbine (13a); and depending upon a temperature difference between the temperature of the exhaust gas (12) at the first temperature sensor (18) and the temperature of the exhaust gas (12) at the second temperature sensor (19), automatically determining and automatically adjusting the amount of extra energy to be provided at the power take-in (21) for driving the low-pressure compressor (16b), such that the greater the temperature drop and thus the energy loss along the at least one exhaust gas aftertreatment device, the more energy is fed to the power take-in (21) and thus to the low-pressure compressor (16b), so as to supply the cylinders (11) of the internal combustion engine (10) with an adequate amount of charge air.

7. The method according to claim 6, wherein at the high-pressure turbine (13a) energy for driving the power take-in (21) is extracted via a power take-out (24).

8. A control device (20) of an internal combustion engine (10), the control device (20) being configured to carry out the method according to claim 6.

* * * * *